(12) United States Patent
Spears

(10) Patent No.: US 11,797,899 B2
(45) Date of Patent: Oct. 24, 2023

(54) SYSTEM AND METHOD FOR ON-DEMAND PROVISIONING OF CLEANING AND DISINFECTING SERVICES

(71) Applicant: Patrick Orrin Spears, Brentwood, CA (US)

(72) Inventor: Patrick Orrin Spears, Brentwood, CA (US)

(73) Assignee: CLEANNESTA LLC

( * ) Notice: Subject to any disclaimer, the term of this patent is extended or adjusted under 35 U.S.C. 154(b) by 266 days.

(21) Appl. No.: 17/345,163

(22) Filed: Jun. 11, 2021

(65) Prior Publication Data

US 2021/0304112 A1  Sep. 30, 2021

(51) Int. Cl.
| | | |
|---|---|---|
| *G06Q 10/00* | (2023.01) | |
| *G06Q 30/00* | (2023.01) | |
| *G06Q 10/0631* | (2023.01) | |
| *G06Q 10/1053* | (2023.01) | |
| *G06Q 30/08* | (2012.01) | |
| *G06Q 30/04* | (2012.01) | |
| *G06Q 30/0283* | (2023.01) | |

(52) U.S. Cl.
CPC .  *G06Q 10/063112* (2013.01); *G06Q 10/1053* (2013.01); *G06Q 30/0283* (2013.01); *G06Q 30/04* (2013.01); *G06Q 30/08* (2013.01)

(58) Field of Classification Search
CPC .......................................... G06Q 10/00–50/00
USPC ....................................................... 705/7.14
See application file for complete search history.

(56) References Cited

U.S. PATENT DOCUMENTS

| | | | | |
|---|---|---|---|---|
| 9,274,672 | B1 * | 3/2016 | Huang | G06F 11/3419 |
| 10,963,848 | B1 * | 3/2021 | Anderson | G06Q 30/0611 |
| 2002/0116318 | A1 * | 8/2002 | Thomas | G06Q 40/04 |
| | | | | 705/37 |
| 2018/0268370 | A1 * | 9/2018 | Fallah | H04L 63/0428 |
| 2019/0266571 | A1 * | 8/2019 | Lamoncha | G06Q 10/063112 |

* cited by examiner

*Primary Examiner* — Mustafa Iqbal

(57) ABSTRACT

A computer implemented system and method for providing cleaning and disinfecting services. A user interface provided on a client device by a computer system is configured to enable a customer and a specialist to input service parameters indicative of the cleaning service. A preliminary proposal is sent to a customer on receipt of request for cleaning service. The computer system acquires information on current location and availability of specialists within a certain perimeter around the customer's place where the cleaning service is required to be provided. A specialist is then selected and notified about the cleaning service job. Payment parameters are determined based on actual service rendered corresponding to updated service parameters upon completion of the cleaning service. The specialist is tracked on real-time basis all the time to determine the time spent on the job. Transactions are completed automatically and feedback options are provided on completion of the transactions.

12 Claims, 13 Drawing Sheets

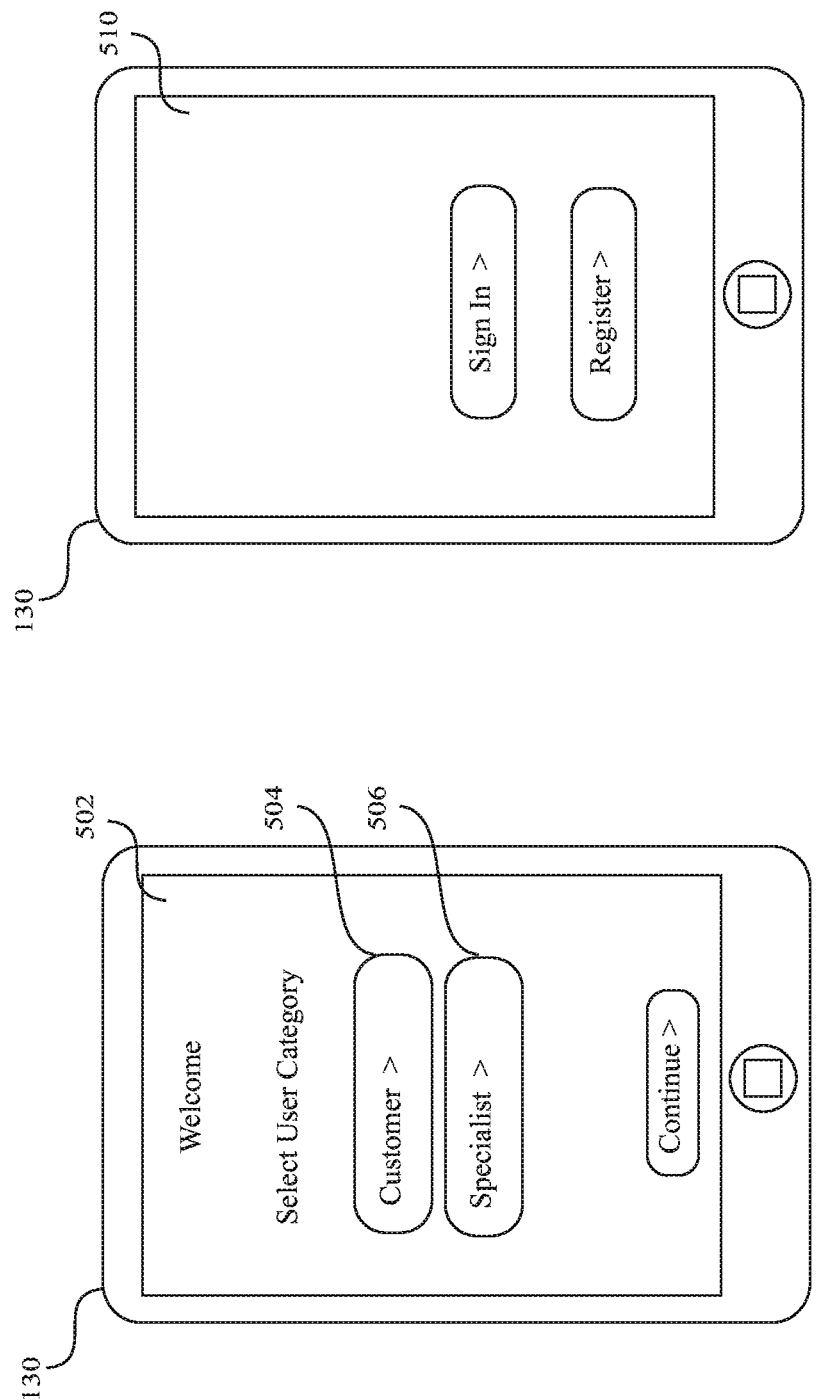

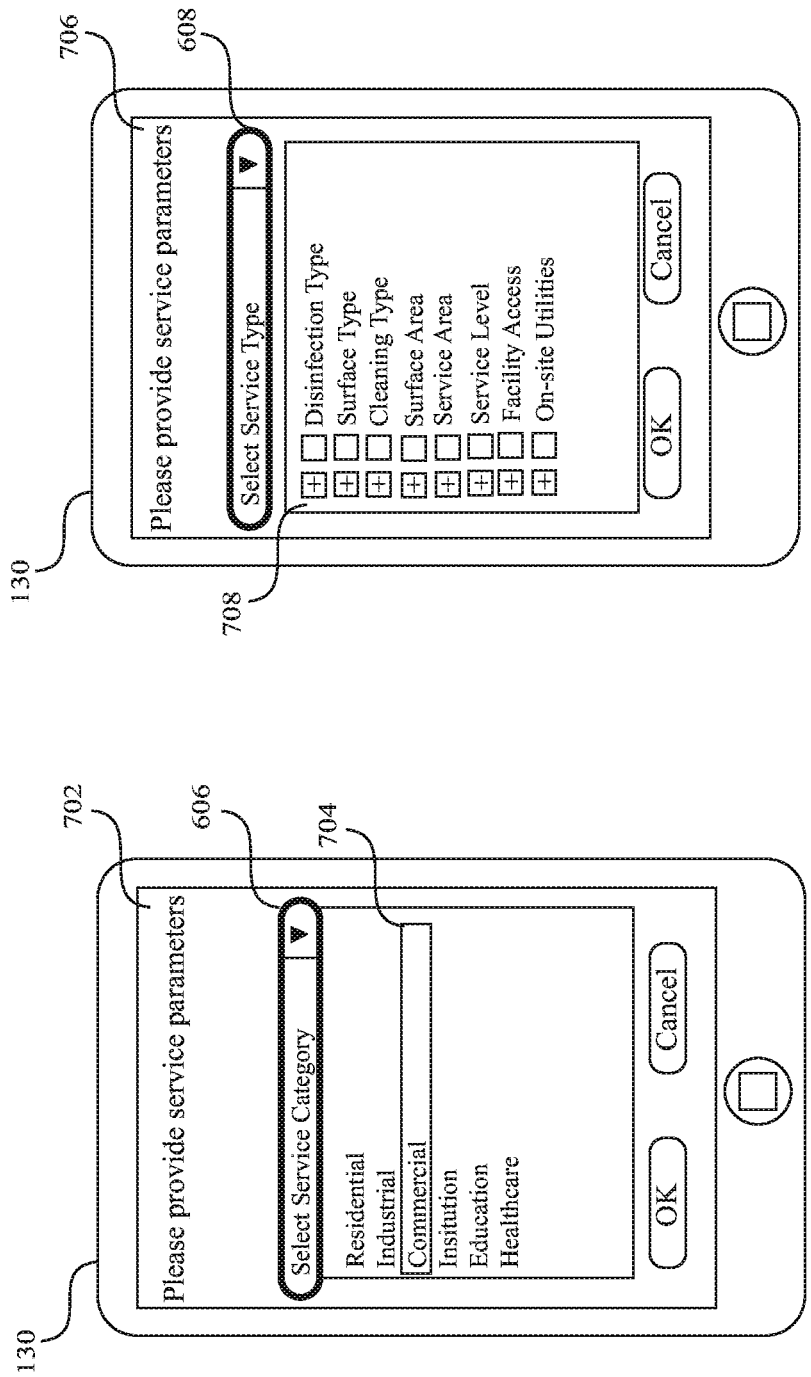

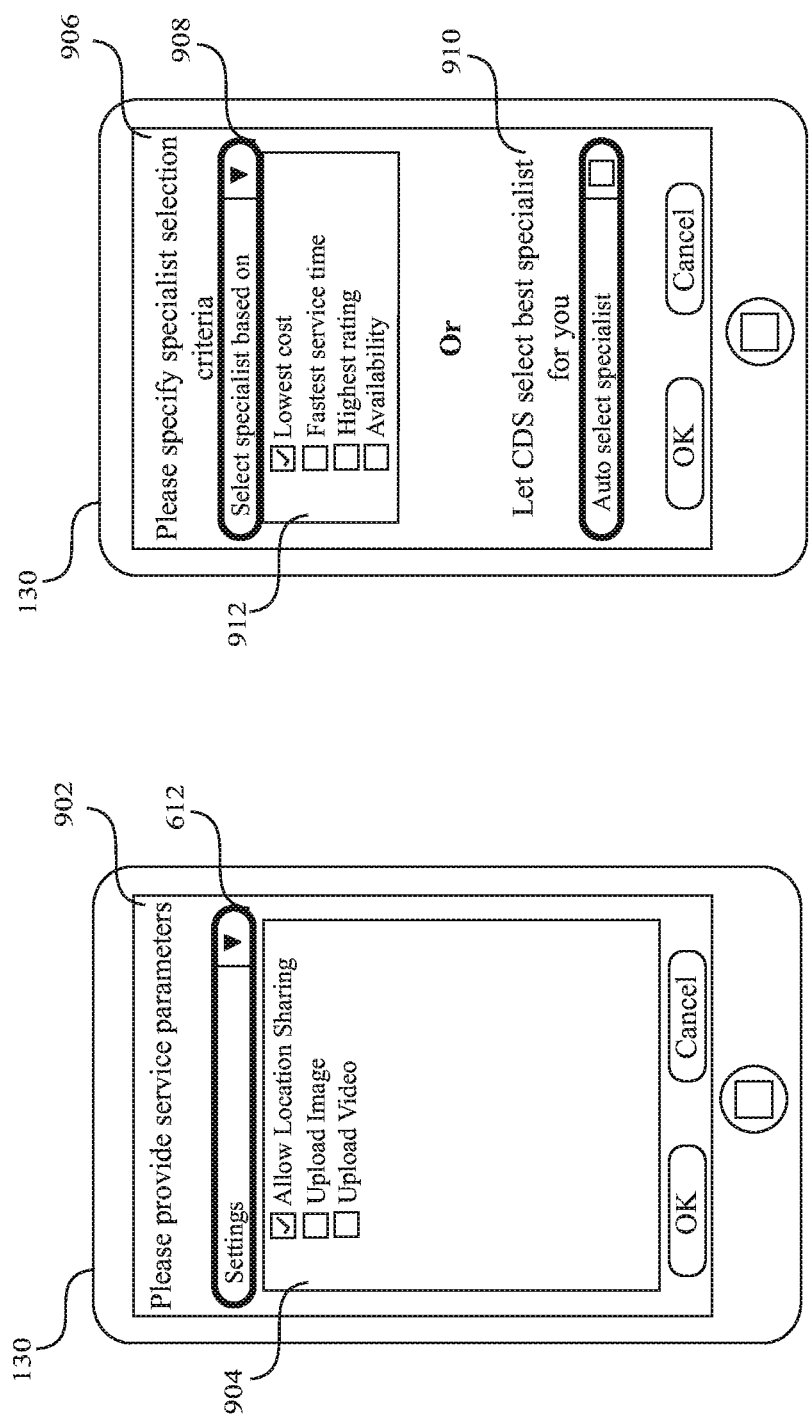

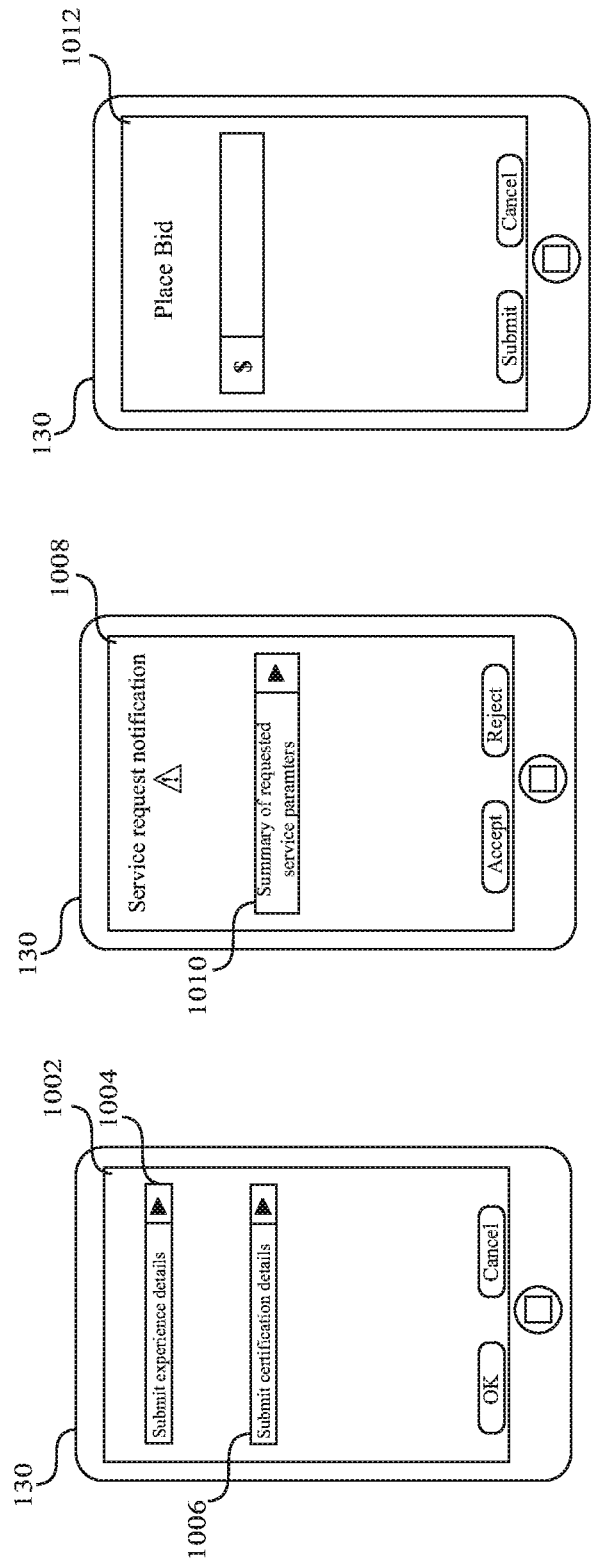

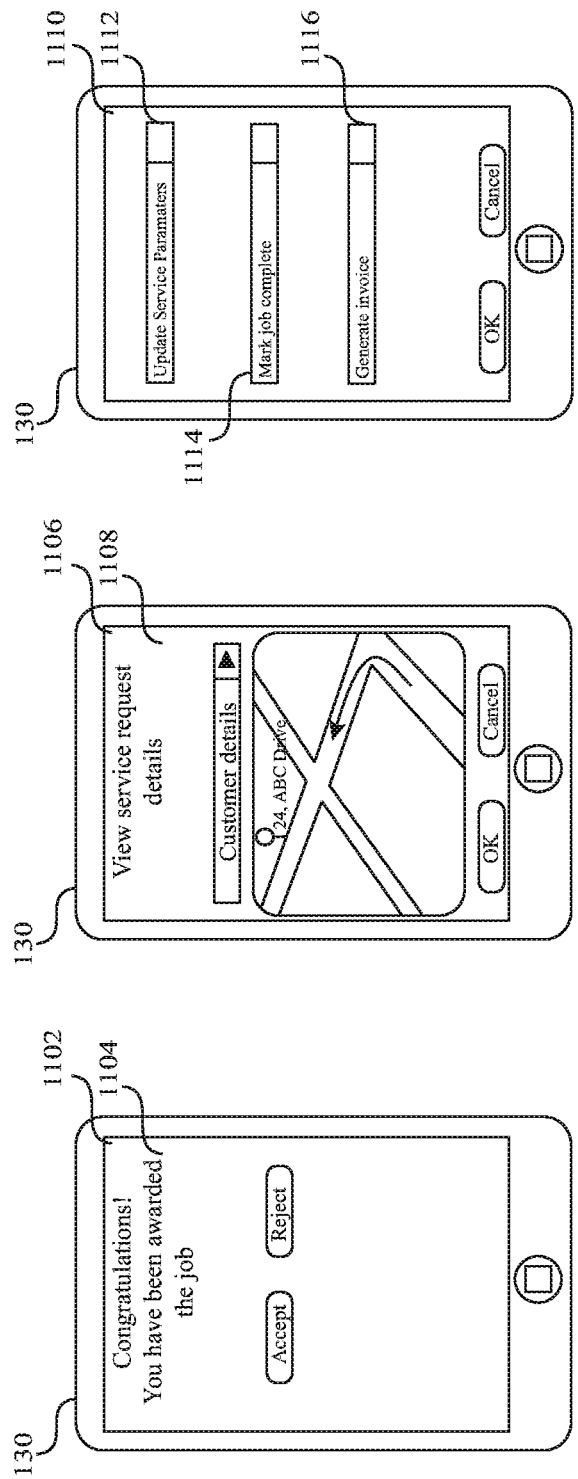

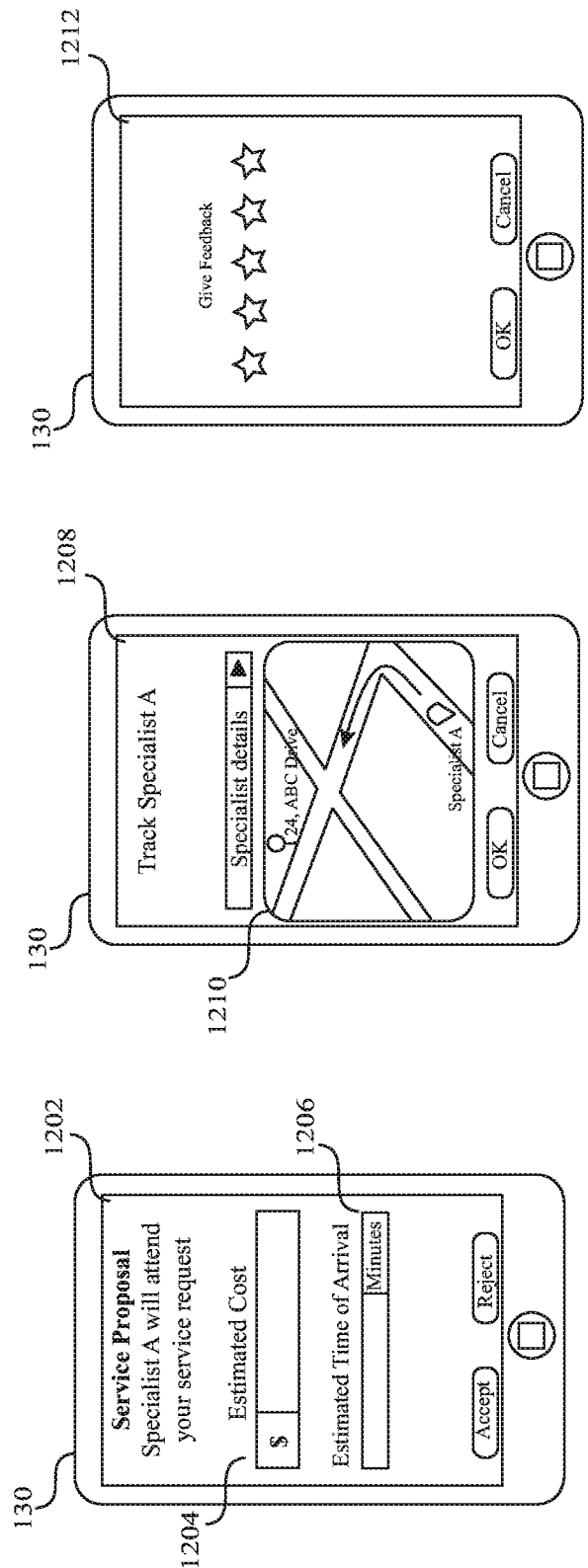

SYSTEM AND METHOD FOR ON-DEMAND PROVISIONING OF CLEANING AND DISINFECTING SERVICES

FIELD OF THE INVENTION

The present invention in general is related to systems and method for providing cleaning and disinfecting services at commercial and non-commercial places. More particularly, the present invention is related to a system and method for enabling on-demand and scheduled procurement and tracking of select cleaning and disinfecting services.

BACKGROUND OF THE INVENTION

It is common for both commercial and non-commercial entities to outsource cleaning and disinfecting services for the custodial care of their respective properties. Generally, contracts are established with cleaning and disinfecting service providers for fulfilling any required cleaning and disinfecting services. In such cases, the cleaning and disinfecting service providers plan and manage the cleaning and disinfecting service operations and deploy their manpower on site at regular basis to carry out the cleaning tasks such as vacuuming, dusting and washing floors etc. However, often an on-demand cleaning and disinfecting service is also required by many commercial and non-commercial establishments including residential, households, to meet their specific or one-time needs.

The request for an on-demand cleaning and disinfecting service can be made to a cleaning and disinfecting service provider by a client through several ways including making of telephonic and online requests. Presently, the cleaning and disinfecting service providers will send a representative to the place to be cleaned to assess the scope of cleaning work to be carried out. Subsequently, based on that assessment a cost estimate is sent to the client. Only after receiving approval from the client the cleaning and disinfecting service provider sends their cleaning staff with equipment and material to carry out the cleaning job. As a result, the time taken by the process from placing a request for cleaning and disinfecting service to the start of the job takes a significant amount of time. Even in cases of scheduled cleaning and disinfecting services for which onsite deployment of cleaning staff is not made on regular or on daily basis and when a large number of such distant sites are to be covered, efficient deployment of staff for providing the cleaning and disinfecting services at each site becomes a challenge. Due to uncertainty of time required to be spent in activities such as travelling of cleaning staff and cleaning of a place it is difficult to optimize utilization of resources when the cleaning staff are not deployed on site for a definite period of time on daily or regular basis.

Thus, there exists a need for a system and method that overcomes the above-mentioned disadvantages associated with the conventional cleaning and disinfecting service providers.

OBJECTS OF THE INVENTION

It is, therefore, an object of the present invention to provide a system and method for real-time management of cleaning and disinfecting services provided at commercial and non-commercial places.

Another object of the present invention is to provide a system and method for optimizing resources in providing cleaning and disinfecting services.

Yet another object of the present invention is to provide a system and method for providing expeditious cleaning and disinfecting services.

Another object of the present invention is to provide a system and method for real-time tracking of field personnel.

Yet another object of the present invention is to provide an interactive user interface for managing cleaning and disinfecting services.

Another object of the present invention is to provide a system and method for automation in estimation, verification, confirmation and payment settlement related to the fulfillment of cleaning and disinfecting services.

Yet another object of the present invention is to provide a user friendly interface for customers requesting cleaning and disinfecting services.

Details of the foregoing objects and of the invention, as well as additional objects, features and advantages of the invention will become apparent to those skilled in the art upon consideration of the following detailed description of the preferred embodiments exemplifying the best mode of carrying out the invention as presently perceived.

SUMMARY OF THE INVENTION

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The present invention is directed to a system and method for providing a customer-centric interface for on-demand sourcing of cleaning and disinfecting services. The system comprises a computer system and a number of client devices connected to the computer system over a network. A cleaning and disinfecting service application executed on the client devices provides a user interface on the client devices. The computer system is configured to communicate with the client devices. The user interface enables a customer to make a request for a cleaning and disinfecting service and select service parameters relevant to the cleaning and disinfecting service. Specialists, who are persons registered with the computer system as cleaning and disinfecting service providers, use the user interface on their client devices to indicate the service parameters on which they are able to provide service. Upon receiving a request for a cleaning and disinfecting service from a client device associated with a customer, the computer system carries out a check to find out the specialists suitable for the job as per the customer selected service parameters and are available around the place where the cleaning and disinfecting service is to be provided as per the customer preferred service schedule. The location of the specialists, determined and based partly on the location of the client devices associated with them, are taken into consideration while searching for specialists. In some embodiments, the computer system asks shortlisted specialists to place their bids for the job. If the customer prefers to choose a specialist based on any of the specialist selection criteria such as suitability of a specialist against customer selected service parameters, specialist's experience, specialist's historical performance including feedback/ratings, bid/price range, specialist's estimated travel time to customers place or proximity of specialist's location to customer's location etc. then the computer system selects the specialist as per the customer specified selection criterion. Otherwise, if a customer opts for specialist auto-selection for a cleaning and disinfecting service then the computer system calculates a selection score for each specialist based on a standard set of specialist selection criteria. A list comprising the specialists is then prepared in descending order of the selection score with the top ranked specialist having the highest selection score. The top ranking specialists are then sent notification regarding the available cleaning and disinfecting service request. Upon issuance of the service request, the selected specialist may update the service parameters after completion of the cleaning and disinfecting service using the user interface. The computer system determines payment parameters based on the updated service parameters which also includes amount of time spent by the specialist calculated based on real-time location tracking of the specialist's client device. Transfer of funds is executed as per approved methods and the user interface enables input of feedback by both the customer and the specialists.

To the accomplishment of the foregoing and related ends, certain illustrative aspects of the disclosed invention are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

In order to describe the manner in which features and other aspects of the present disclosure can be obtained, a more particular description of certain subject matter will be rendered by reference to specific embodiments that are illustrated in the appended drawings. Understanding that these drawings depict only typical embodiments and are not therefore to be considered to be limiting in scope, nor drawn to scale for all embodiments, various embodiments will be described and explained with additional specificity and detail through the use of the accompanying drawings in which:

FIGS. 5A-5B illustrate non-limiting exemplary screenshots of Graphical User Interface (GUI) or user interface provided by the present invention showing an introductory screen in connection with logon/signup in accordance with an embodiment of the present invention;

FIG. 7A illustrates a non-limiting exemplary screenshot of the user interface for selection of service category for cleaning and disinfecting services in accordance with an embodiment of the present invention;

FIG. 7B illustrates a non-limiting exemplary screenshot of the user interface for selection of service type for cleaning and disinfecting services in accordance with an embodiment of the present invention;

FIG. 9A illustrates a non-limiting exemplary screenshot of the user interface for selecting settings in accordance with an embodiment of the present invention;

FIG. 9B illustrates a non-limiting exemplary screenshot of the user interface which enables a customer to input specialist selection criterion in accordance with an embodiment of the present invention;

FIG. 10A illustrates a non-limiting exemplary screenshot of the user interface which enables a specialist to submit experience and certification details in accordance with an embodiment of the present invention;

FIG. 10B illustrates a non-limiting exemplary screenshot of the user interface showing notification to a specialist regarding a cleaning and disinfecting service request in accordance with an embodiment of the present invention;

FIG. 10C illustrates a non-limiting exemplary screenshot of the user interface which enables a specialist to place a bid against a cleaning and disinfecting service request in accordance with an embodiment of the present invention;

FIG. 11A illustrates a non-limiting exemplary screenshot of the user interface which allows a specialist to accept or reject a job offer with regard to the cleaning and disinfecting service in accordance with an embodiment of the present invention;

FIG. 11B illustrates a non-limiting exemplary screenshot of the user interface which enables a selected specialist to receive address details of a customer in accordance with an embodiment of the present invention;

FIG. 11C illustrates a non-limiting exemplary screenshot of the user interface for giving inputs with regard to update of service parameters, completion of cleaning and disinfecting service and generation of invoice in accordance with an embodiment of the present invention;

FIG. 12A illustrates a non-limiting exemplary screenshot of the user interface which enables a customer to accept or reject a service proposal against a cleaning and disinfecting service request in accordance with an embodiment of the present invention;

FIG. 12B illustrates a non-limiting exemplary screenshot of the user interface which enables a customer to view and track location of a selected specialist in accordance with an embodiment of the present invention;

FIG. 12C illustrates a non-limiting exemplary screenshot of the user interface for giving feedback by a customer and/or by a specialist against a cleaning and disinfecting service in accordance with an embodiment of the present invention.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business-related constraints including compliance with statutory and regulatory requirements, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
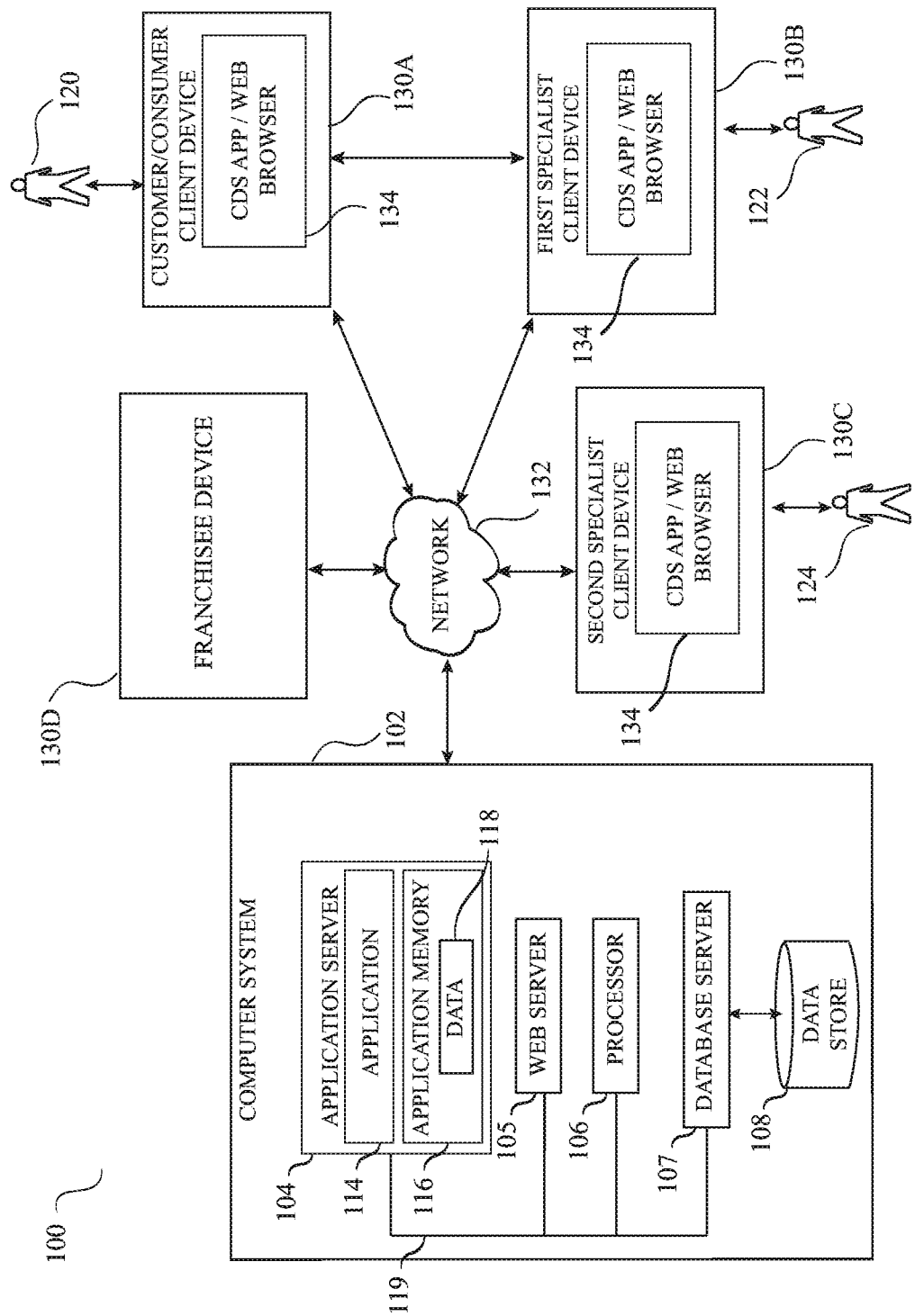
FIG. 1 illustrates a general architecture of a system for providing cleaning and disinfecting services that operates in accordance with an embodiment of the present invention.

FIG. 1 illustrates the general architecture of a system 100 for providing cleaning and disinfecting services that operates in accordance with one embodiment of the present invention. Four numbers of computing devices or client devices 130A, 130B, 130C and 130D are shown connected to a computer system 102 via a network 132. Although, only four computing devices or client devices are illustrated in FIG. 1, it is to be understood that there can be a plurality of client devices connected to the computer system 102. The computer system 102 communicates with the client devices over the network 132 to present a user interface for customers and specialists for sourcing and fulfilling cleaning and disinfecting services. The user interface of the system for providing cleaning and disinfecting services of the present invention can be presented on the client device through a web browser or through a native mobile application communicating with the computer system 102 and is used for displaying, entering and/or managing data and for interacting with the system. As used herein, the term "network" generally refers to any collection of distinct networks working together to appear as a single network to a user. The term also refers to the so-called world wide "network of networks" or Internet which is connected to each other using the Internet protocol (IP) and other similar protocols. As described herein, the exemplary public network 132 of FIG. 1 is for descriptive purposes only and it may be wired or wireless. Although, the description may refer to terms commonly used in describing particular public networks such as the Internet, the description and concepts equally apply to other public and private computer networks, including systems having architectures dissimilar to that shown in FIG. 1. The inventive idea of the present invention is applicable for all existing cellular/telecommunication network topologies or respective communication standards, in particular GSM, UMTS/HSPA, LTE and future standards.

The graphical user interface (GUI) or user interface presented by the system 100 on the client devices through a web browser or mobile app may be utilized by the users for activities related to providing cleaning and disinfecting services such as signing up, logging in, making request for cleaning and disinfecting services, selecting service parameters and getting real time updates and alerts etc.

The components appearing in the system 100 for providing cleaning and disinfecting services refer to an exemplary combination of those components that would need to be assembled to create the infrastructure in order to provide the tools and services contemplated by the present invention.

The computer system 102, as shown in FIG. 1, includes an application server or executing unit 104, a web server 105, a processor 106, a database server 107 and a data store 108. The application server 104 supports operation of at least one service. Physically, the application server 104 may be an independent device residing outside the computer system 102, or integrated in the computer system 102 as shown in FIG. 1, which is not limited by this embodiment in any manner.

The computer system 102 performs a portion or all of the processing steps of system for sourcing and fulfilling cleaning and disinfecting services described herein in response to the processor 106 executing one or more sequences of one or more instructions contained in the application memory 116 included in the system. Computer system 102 may include one computer or multiple computers with different software components operating on different computers. The application server 104 includes an application 114 including executable application code for performing the functions of the application. Application 114 may store data 118 in application memory 116. Application memory 116 may include internal tables, for example, or other data structures for maintaining and manipulating data used by application 114. Application memory 116 may store data corresponding to simple or complex data structures. One or more processors 106 in a multi-processing arrangement may also be employed to execute the sequences of instructions contained in memory. The term "computer readable medium" as used herein refers to any medium that participates in providing instructions to the processors for execution. A computer readable medium may take many forms, including but not limited to, non-volatile media, volatile media, and transmission media. Non-volatile media includes, for example, optical, magnetic disks, and magneto-optical disks, such as the hard disk or the removable media drive.

The Web server 105 is a system that sends out Web pages containing electronic data files in response to Hypertext Transfer Protocol (HTTP or HTTPS) requests or similar protocol requests from remote browsers (i.e. browsers installed in the client devices) or in response to similar requests made through a mobile app or mobile application of the present invention installed on a client device. The web server 105 can communicate with the mobile app of the present invention and/or with a web browser installed on client devices 130A-130D to provide the user interface required for sourcing and fulfilling the cleaning and disinfecting services.

As shown in FIG. 1, application server 104 may communicate with the database server 107 over communication channel 119. Database server 107 includes data store 108. Data store 108 may be an in-memory database, for example and/or may include database persistent storage which may be a hard disk drive, for example. The above configuration of application server 104, web server 105 and database server 107 are illustrative only, and it is to be understood that features and embodiments of the present invention may be implemented in other configurations.

Figure 13:
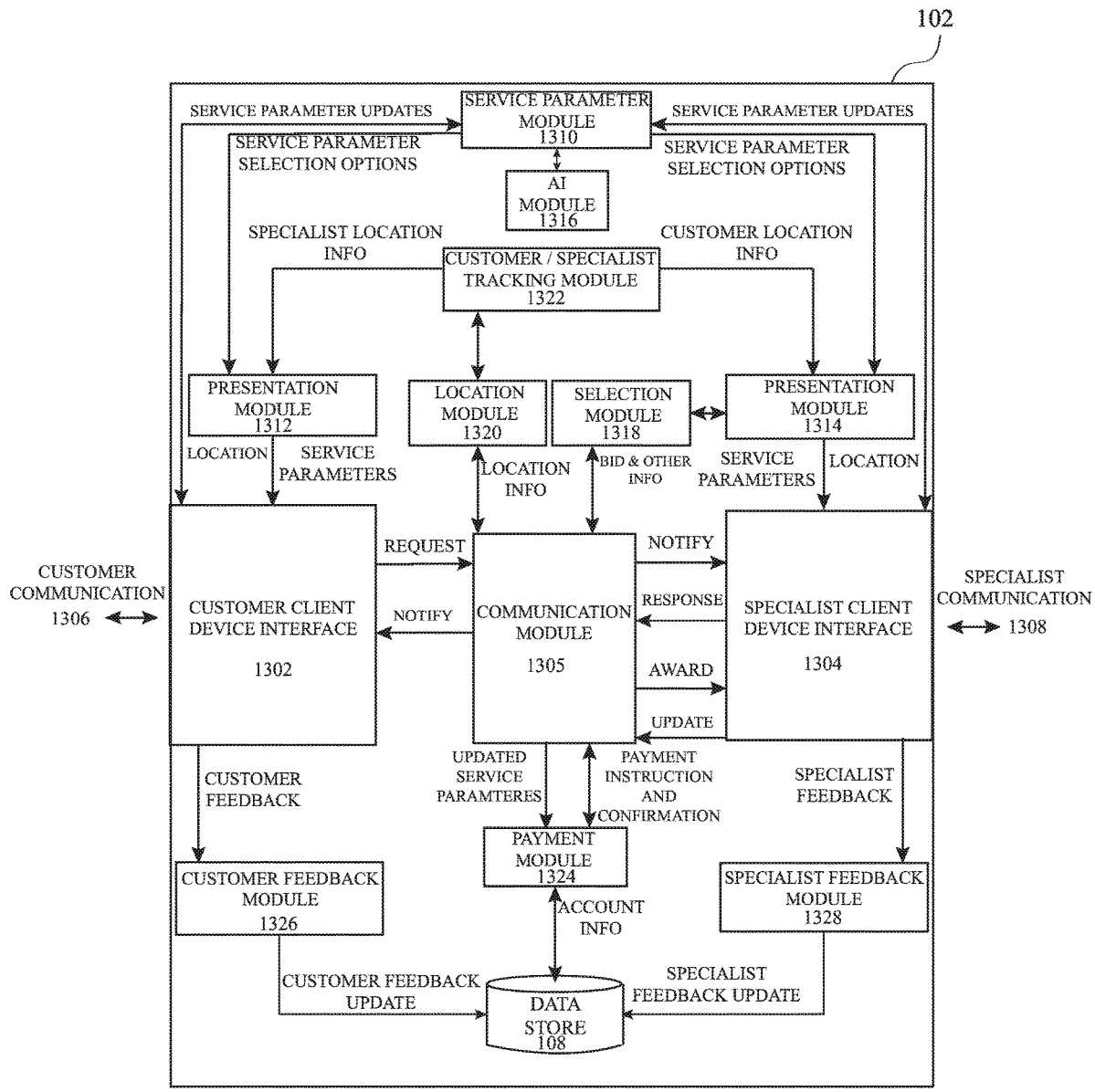
FIG. 13 illustrates a logical representation of the functioning of the computer system of the present invention for providing cleaning and disinfecting services in accordance with an embodiment.

Reference to FIG. 13, AI module 1316 is configured to carry out analysis of visual imagery acquired from client devices 130 to carry out an image recognition process to facilitate determination of scope of work and confirmation of completion of work with respect to a cleaning and disinfecting service rendered under the present invention. The artificial intelligence module 1316 analyzes the acquired images and looks for objects based on many factors including size, shape, color etc. of the objects found in the images to determine various service parameters automatically. In order to carry out image recognition/classification, the AI module 1316 carries out feature extraction. The image recognition steps adopted by the present invention may include preparation of the training data (for example, labeling of surface as cleaned and dirty), creating the deep learning model, training the model (i.e. fit the model to the training data) and evaluation of model accuracy on a test validation dataset of images.

The customer/specialist tracking module 1322 of the computer system 102, as shown in FIG. 13, is configured to determine and track location of client devices 130 on real-time basis. In some embodiments, the client devices 130 are configured to transmit their own respective GPS-identified geographical location to the location module 1320 of the computer system 102 so that customer/specialist tracking module 1322 is able to track absolute and relative locations of the client devices 130. To facilitate such tracking, the customer/specialist tracking module 1322 may enable a visual display of current locations of the client devices 130 through the user interface.

Although, the description of the system 100 for providing cleaning and disinfecting services may refer to terms commonly used in describing particular computer servers, the description and concepts equally apply to other processing systems, including systems having architectures dissimilar to that shown in FIG. 1.

Figure 2:
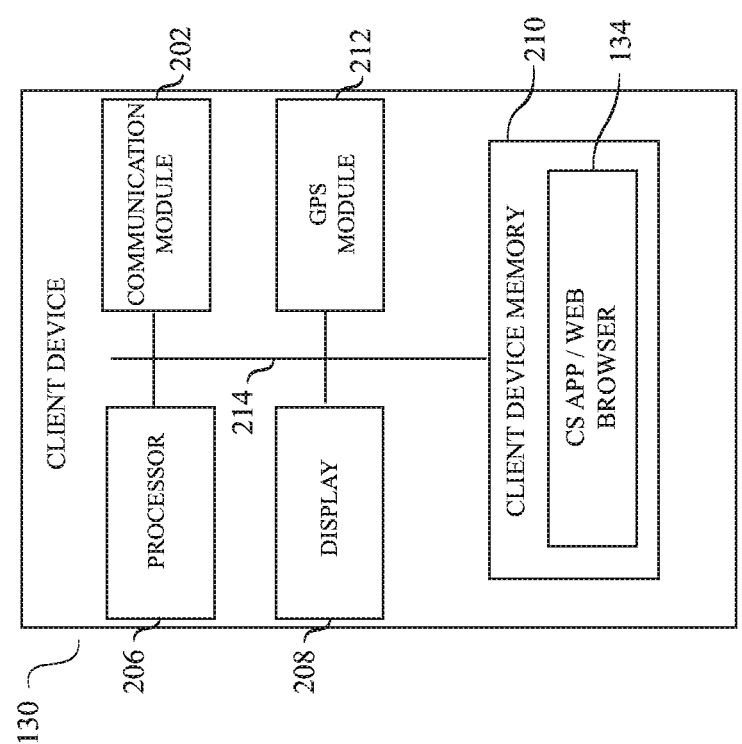
FIG. 2 illustrates a general architecture of a client device that operates in accordance with an embodiment of the present invention.

FIG. 2 illustrates a client device 130 suitable for use with the various embodiments. The general architecture of the client device 130 depicted in FIG. 2 is same for all client devices 130A, 130B, 130C and 130D used in the present invention. The components described with respect to the client device 130 enables communication with the computer system 102. As shown in FIG. 2, client device 130 may comprise a communication module 202, a processor 206, a display 208, a client device memory 210 and a GPS module 212. The memory 210 may include a non-transitory storage medium such as a disk drive, a flash drive, a solid state memory device, a memory circuitry, or some other memory device, in various forms of volatile and non-volatile memory storage, and may store processor-executable instructions, such as an operating system, computer programs, firmware, cleaning and disinfecting service mobile application of the present invention or some other form of processor-executable instructions, which may include an operating system, utilities, drivers, network interfaces, applications, or some other type of software. The display 208 may display information, and may present the user interface of the present invention to receive input and display information. The communication module 202 may include various elements to enable the client device 130 to communicate with another device and/or with a communication network (such as the communication network 132 of FIG. 1) including interfaces, transceivers, and other hardware and/or related software. The processor 206 may control the operation of the display 208, the communication module 202, and the client device memory 210, over a communication link 214 such as a bus or other communication link. The client device memory 210 may store a browser application and/or the cleaning and disinfecting service mobile app 134. The browser application and/or the mobile app 134 may enable the client device 130 to communicate with a web server (e.g., the web server 105 of FIG. 1).

The cleaning and disinfecting service mobile application or "mobile app" is a computer program that may be downloaded and installed on client devices using methods known in the art. It can also be a set of instructions programmed on the hardware of the client device or a pre-loaded computer program or firmware or any such native application supplied with the client device. Hereinafter, the mobile app/native application of the present invention and/or the user interface of the invention presented through a web browser by the system 100 for providing cleaning and disinfecting services are alternatively and interchangeably referred to as Cleaning and Disinfecting Service (CDS) app. The CDS app enables one or more users to access various features related to the system for sourcing and fulfilling cleaning and disinfecting services via the present invention. Examples of client device 130 may include, but not limited to mobile devices, tablets, hand-held or laptop devices, smartphones, personal digital assistants, desktop computer or any similar computing devices.

An embodiment of the present invention will be described by way of a non-limitative example and with reference to the accompanying drawings. The system 100 for providing cleaning and disinfecting services of the present invention will be described herein in the context of a person seeking cleaning and disinfecting services.

Reference to FIGS. 1, 2 and 13, the computer system 102 communicates with the client devices over the network 132 to present a user interface for the present invention. Users, such as 120, 122 and 124 shown in FIG. 1 can access the user interface provided through a web browser or through the CDS app 134 installed on the client devices 130A-130D. Reference to FIG. 13, customer client device interface 1302 and specialist client device interface 1304 of computer system 102 handles the customer communications 1306 and specialist communications 1308 respectively with the client devices. A communication module 1305 handles all the internal communications inside the computer system 102. An introductory screen 502, as shown in FIG. 5A, may be presented on the user interface of client device 130 which enables a user to select a user category (user category 504 for customer, 506 for specialist, for example) under which he/she wants to use the cleaning and disinfecting service. The term "specialist" is used herein to refer to a person who renders cleaning and disinfecting services as per the present invention. In the present example, user 120 is a customer who is looking for a cleaning and disinfecting service and users 122 and 124 are specialists registered with the computer system 102 as cleaning and disinfecting service providers. Users 122 and 124 can be registered with the computer system 102 as specialists directly or as employees of a franchisee of the system for providing cleaning and disinfecting services of the present invention. Client device 130D of FIG. 1 is shown as a client device used by such a franchisee to access the system 100 for providing cleaning and disinfecting services of the present invention.

Reference to exemplary screen 510 of FIG. 5B, for signing up or registration, a user may be asked to provide some personal and/or professional details including details required for completing a monetary transaction. In some embodiments, apart from logging into the system as registered user, a user may be allowed to access the system as a guest user also. In a preferred embodiment, every registered user is assigned a unique identification. This unique identity may be linked to one or more information provided by the user (to telephone/mobile number of the user, for example). In another embodiment, one or more client devices may be associated with every registered user. For example, a mobile contact number of a registered user may be used to associate a smartphone of the user to the user identity. All such relevant user information is then stored in data store 108 of the computer system 102.

Figures 6A, 6B:
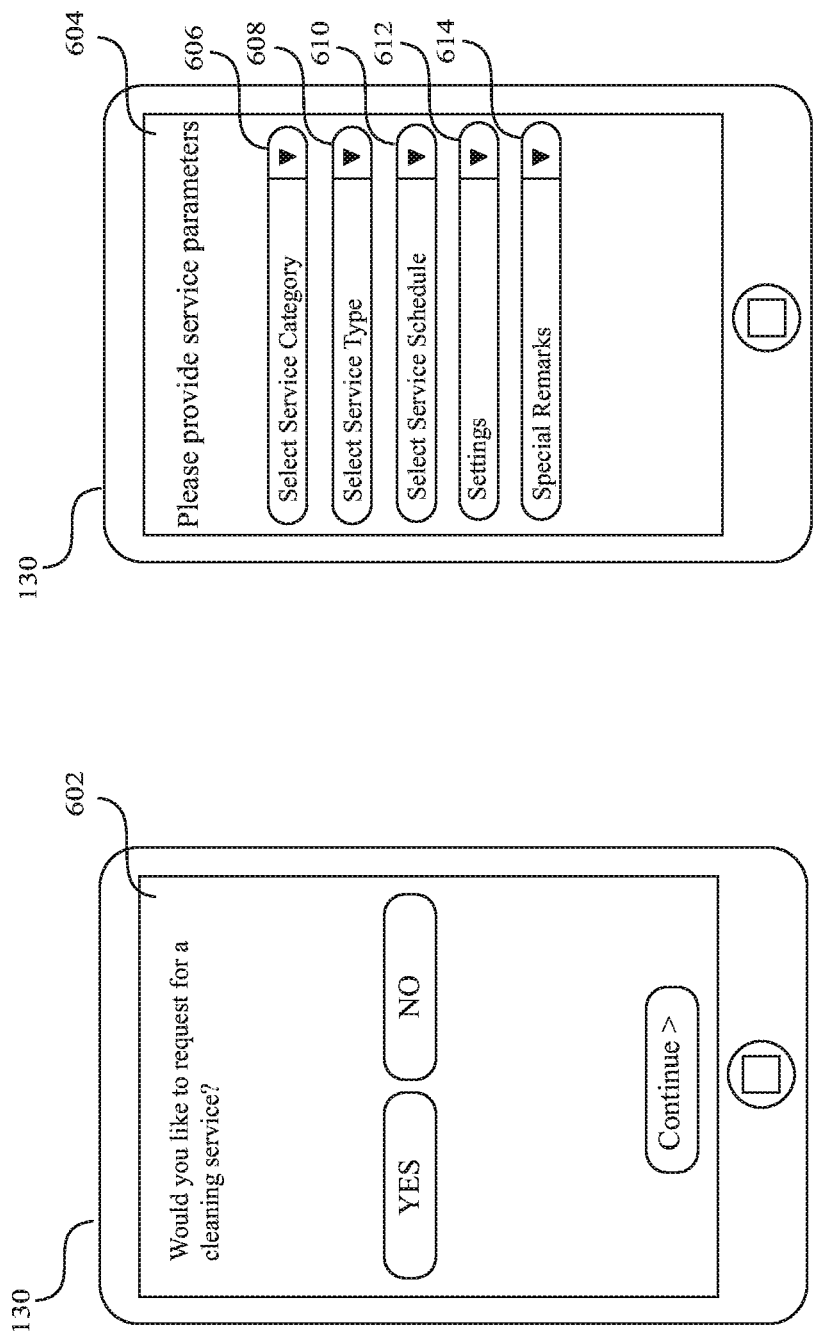
FIGS. 6A-6B illustrate non-limiting exemplary screenshots of the user interface provided by the present invention for making a request for cleaning and disinfecting service and options of selecting service parameters with respect to a cleaning and disinfecting service in accordance with an embodiment of the present invention.

In the present example, user 120 being a customer selects customer category 504 of screen 502 to proceed. Reference to FIG. 6A, if the customer 120 selects "Yes" button on screen 602 to make a request for a cleaning and disinfecting service as in step 302 of FIG. 3, the user is asked to provide/select the service parameters i.e. to provide the details relevant to the requested cleaning and disinfecting service which are required to make an initial assessment of the scope of work. Reference to FIG. 13, the service parameter module 1310 of computer system 102 enables, through presentation modules 1312 and 1314 respectively, presentation of the service parameter selection options on user interface provided on customer and specialist client devices. Service parameters may include service categories, service types, service schedules and other parameters relevant for a cleaning and disinfecting service. Screen 604 of FIG. 6B illustrates some of the service parameter selection options such as service category 606, service type 608, service schedule 610, settings 612 and special remarks 614.

Figures 8A, 8B:
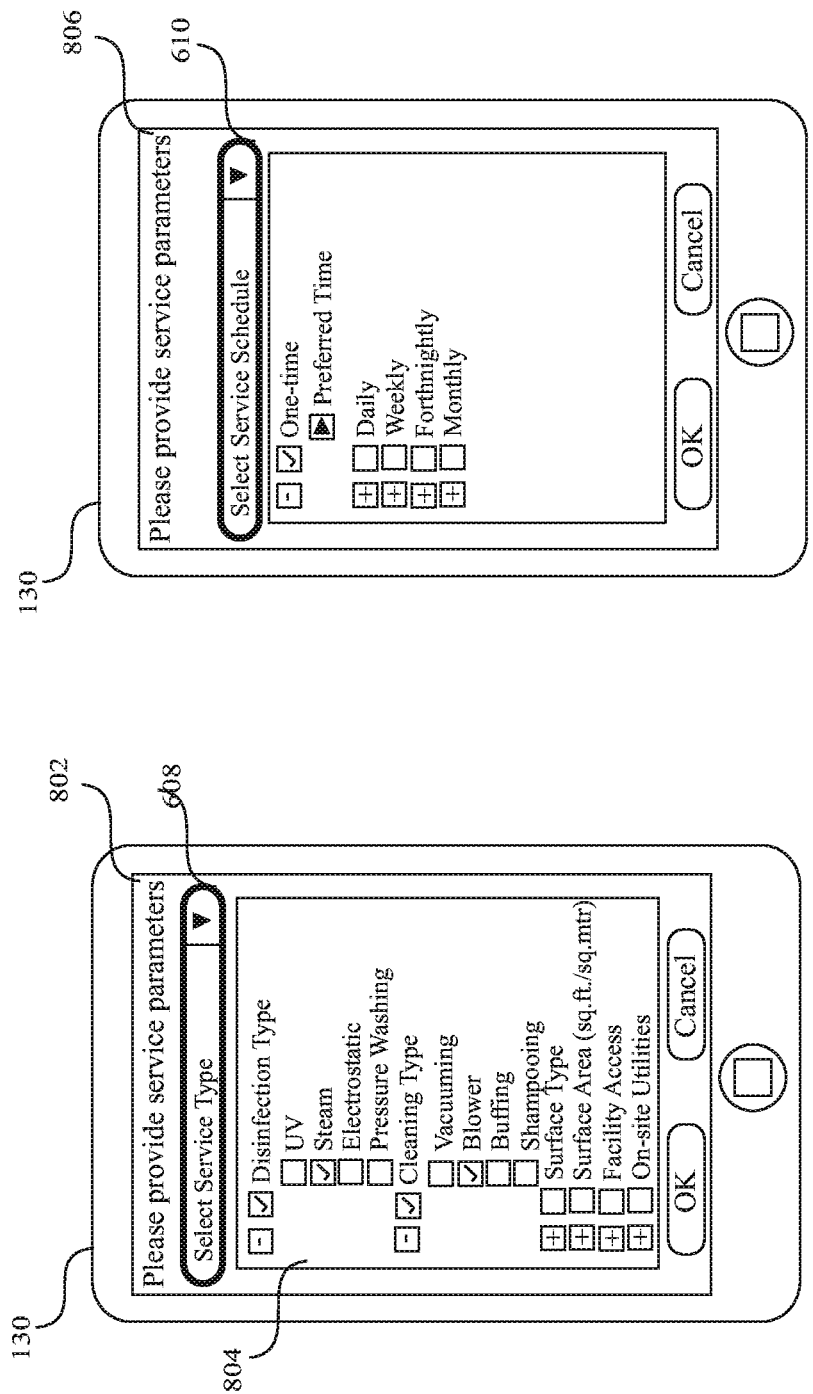
FIG. 8A illustrates a non-limiting exemplary screenshot of the user interface for selection of one or more subcategories of service type for cleaning and disinfecting services in accordance with an embodiment of the present invention.
FIG. 8B illustrates a non-limiting exemplary screenshot of the user interface for selection of service schedule for cleaning and disinfecting services in accordance with an embodiment of the present invention.

The user interface provides easy navigation options for quickly completing a cleaning and disinfecting service request. The user interface also enables selection of various service parameters from pre-defined options. For instance, a drop down service category selection option 606 on user interface 702 of FIG. 7A allows a user to select any of the relevant service categories such as residential, industrial, specialized service (hospitals, nursing homes, clinics, use of special chemicals, for example) and commercial etc. FIG. 7A shows selection of a service category commercial 704 by the customer 120. As shown in FIG. 7B, the user interface 706 then asks the user to select one or more required service types 708 from the service type selection option 608. Every service type may comprise two or more sub-categories. In the present example, as shown on user interface 802 of FIG. 8A, sub-categories 804 of cleaning and disinfecting service type comprising UV cleaning, steam cleaning, and electrostatic cleaning etc. are available for a user to select from under the disinfection service type. Similarly, vacuuming, buffing, shampooing etc. sub-categories can be selected under cleaning type. A user may be required to provide further information on service types in terms of surface area (in square foot or in square meter as unit of measurement) to be cleaned, service area (restroom, kitchen, lobby etc., for example), service level (level of effort expected to be put in for the cleaning and disinfection) type of the surface (tiles, wooden etc., for example) to be cleaned, information on ease of access to the cleaning site and on availability of on-site utilities, etc. The present invention not only enables a customer to request for on-demand or regular cleaning and disinfecting services but it also enables specialists to render timely cleaning and disinfecting services against such requests. FIG. 8B illustrates selection of one-time service schedule 610 on user interface 806 for the present example. Be it a one-time or regular cleaning and disinfecting service request, the computer system 102 acts on the request as per the service schedule specified or agreed by a customer.

A user is also allowed to give additional data, in addition to the predefined options, with respect to a cleaning and disinfecting service through the user interface. In some embodiments, use of auto mode options such as location sharing, image recognition from uploaded image/video files etc. allow the computer system 102 to collect information on the service parameters automatically without requiring the user to select each and every service parameters separately for requesting a service or to confirm completion of a service. As shown in FIG. 9A, settings 612 may enable selection of one or more options 904, such as location sharing, image upload, video upload etc., on the screen 902 of the user interface. On allowing location sharing by a user the computer system 102 can determine location of a client device and also track it on real-time basis. Activation of the auto mode also enables the computer system to acquire a media file (image/video) captured by a camera of the client device or a file already saved in the client device. The AI module 1316 of the computer system 102 carries out image recognition process to extract the required information from the media files so acquired to assess the service parameters which are needed for estimation of the scope of work or for confirmation of actual service rendered with respect to a cleaning and disinfecting service provided at a place. For example, from an image of a site the AI module 1316 can determine the type of surface and the area to be cleaned at the site and an image of the same site captured after providing the cleaning and disinfecting service can help to confirm completion of the job.

Figure 4:
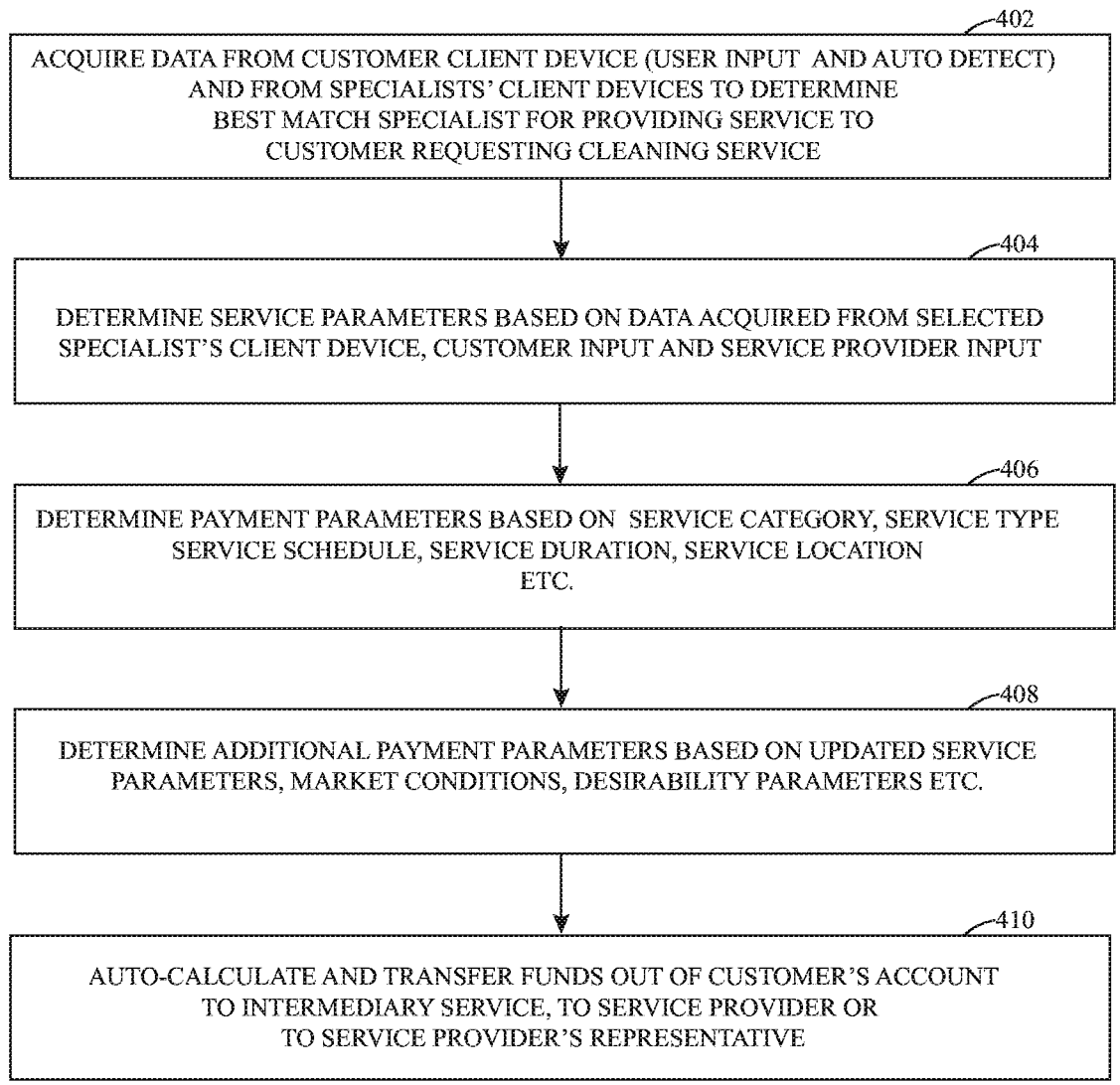
FIG. 4 illustrates a flowchart depicting the general steps associated with the method for providing cleaning and disinfecting services in accordance with an embodiment of the present invention.

The computer system 102 acquires the data related to the service parameters, as in step 402 of FIG. 4, as selected, auto-detected or additionally fed through the client devices 130 by the users. In some embodiments, the computer system 102 then makes an initial preliminary estimation of the scope of the requested cleaning and disinfecting service as in step 404 of FIG. 4 based on the service parameters gathered during the above-mentioned process. The initial estimate comprising price estimation and scope of work for the cleaning and disinfecting service to be rendered is then sent to the client device 130A of the customer 120 by the computer system 102. The process may terminate if the system or the customer 120 does not respectively accept the request or proposal.

On receiving the communication from the customer client device 130A and after acquiring the necessary information, the selection module 1318 of the computer system 102 carries out a series of checks to identify the best matches for users registered as specialists. A customer can specify a criterion for selection of one or more best specialists or the customer can let the computer system 102 select the best specialist for him/her. FIG. 9B illustrates a screen 906 of the user interface which allows a customer to select any of the criteria 912 such lowest cost, highest rating, fastest service time and availability etc. from specialist selection criteria option 908. The customer can otherwise select specialist auto-selection option 910 without specifying any preference for specialist selection. The selection module 1318 then carries out checks based on several criteria such as type of cleaning and disinfecting service, customer location, registered specialists' availability in proximity to the customer's location and local traffic conditions etc. to shortlist a number of specialists. In the context of the present invention, a virtual perimeter around a customer's location (determined from location information received from customer client device or as given by the customer through the user interface) may be defined by geofencing. Whenever a request for a cleaning and disinfecting service is received, customer/specialist tracking module 1322 of the computer system 102 queries a pool of specialists found inside the perimeter based on the current location of the specialists as determined by the location module 1320 in communication with the GPS module 212 of client device 130 used by the specialists as in step 304 of FIG. 3. The geo-fenced area/region in the context of the present invention may also include perimeter defined in three-dimensional Cartesian coordinate system (e.g. a geofenced high-rise residential building with perimeter defined in terms of spatial coordinates to include the entire building vertically also in the perimeter which makes the system first search for best matches from specialists available at different levels of the building).

The selection module 1318 then carries out a bidding process among the shortlisted specialists. The specialists, after accepting the service request notification on screen 1008 of the user interface of FIG. 10B can place their bids using bidding option shown on screen 1012 of FIG. 10C. Before bidding the specialists can view a summary of the requested job using option 1010 on screen 1008. In a preferred embodiment, this matching operation is carried out on real time basis based on the information received from the customer client devices as in step 306 of FIG. 3. If the customer specifies any specialist selection criterion then the selection module selects a specialists based on that criterion. If specialist auto-selection option is preferred by the customer then the selection module 1318 calculates a selection score for each specialist who participates in the bidding process based on the specialist selection criteria which include, for example, bid value, experience, past feedback ratings (historical performance), estimated travel time to reach customer's place, service specialization etc. Each of the specialist selection criteria can have pre-assigned weightage for the score calculation. For example, certification and experience may be given more weightage in the score calculation than other selection factors. The selection module 1318 then prepares a list of shortlisted specialists arranged in descending order of their selection score with the top ranked specialist having highest selection score among others. The selection module 1318 then starts the selection of specialists from the top of the list starting with the top ranked specialists. In the present example, computer system 102 shortlists specialists 122 and 124 on the basis of selection factors and specialist 122 is determined to be the top ranked specialist in the list. When a customer requests for any specialized cleaning/disinfection service which can be provided only by competent authority certified specialists then the computer system 102 shortlists only those specialists who hold such certification as per its records. User interface 1002 of FIG. 10A allows a specialist to submit his/her experience and certification details to the computer system 102 through options 1004 and 1006 respectively.

Figure 3:
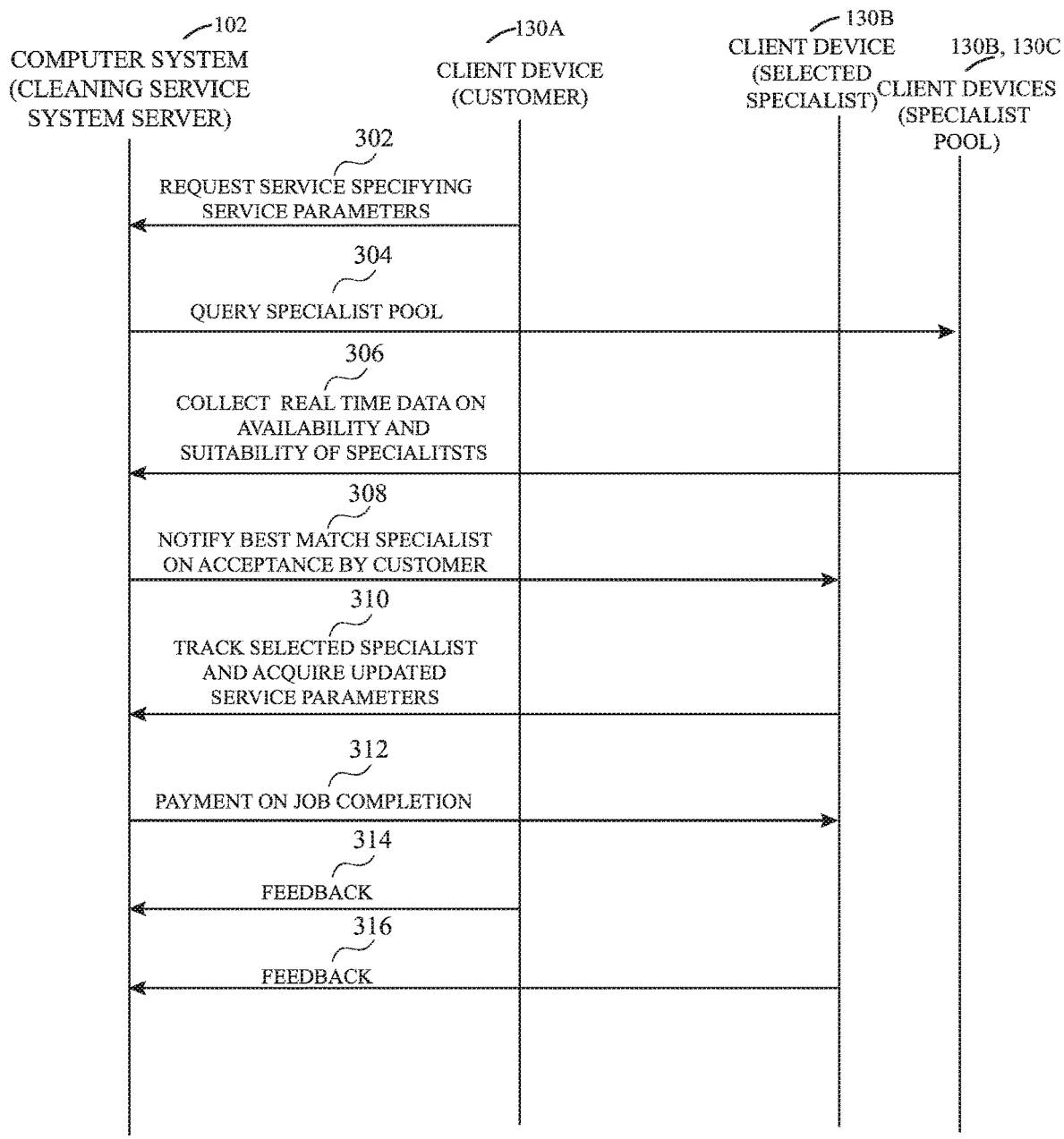
FIG. 3 illustrates a cleaning and disinfecting service implementation process associated with the system for providing cleaning and disinfecting services in accordance with an embodiment of the present invention.

The computer system 102 then sends notification 1104 on user interface 1102 on client device 130 (FIG. 11A) about the job offer against cleaning and disinfecting service request as in step 308 of FIG. 3 to the selected specialist 122 who can be the specialist selected based on customer preferred specialist selection criterion or auto-selected by the computer system 102 based on selection score calculated from the specialist selection criteria values. A specialist may accept or decline the notification through the user interface. In the present example, selected first specialist 122 accepts the notification. The computer system 102 is configured to keep on finding next best matches for specialists as per their ranking till the time a specialist accepts the notification or a customer accepts the service proposal. Once a specialist accepts a cleaning and disinfecting service job offer, the specialists is allowed to view further details of the job including customer address and a dynamic map, as presented by module 1314 with the help of customer tracking module 1322 on the user interface. Screen 1106 of FIG. 11B illustrates presentation of such customer information 1108. Similarly, once a customer accepts a service proposal, using the acceptance option shown on screen 1202 of FIG. 12A, for example, which also shows proposal information such as estimated cost 1204 and estimated time of arrival 1206, the presentation module 1312 enables viewing of further information on the selected specialist. Screen 1208 of FIG. 12B illustrates display of selected specialist related information for a customer after acceptance of proposal by the customer. As shown in FIG. 12B, real-time tracking of a selected specialist, including location on a dynamic map 1210, can be presented on the user interface by the presentation module 1312 with the help of specialist tracking module 1322. In some embodiments, if the computer system 102 determines, based on its assessment of the scope of work, that successful completion of a cleaning and disinfecting service may require more than one specialist at a time, then the computer system 102 sends job notification of step 308 of FIG. 3 to more than one specialist starting from the top ranked specialist of the shortlisted specialists' list arranged in descending order of their selection score. Subsequently, the computer system 102 engages more than one specialist.

The present invention works in the same way when the cleaning and disinfecting services to be rendered fall under any regular service schedule such as daily or weekly schedule etc. In such cases, the computer system acts on the cleaning and disinfecting service request of step 302 of FIG. 3 automatically based on the pre-agreed or customer specified service schedule and thereafter carries out rest of the steps illustrated in FIG. 3. Even for one-time jobs scheduled for a later time, the computer system 102 generates the cleaning and disinfecting service request itself as per the time schedule requested by a customer. In some embodiments, the computer system 102 may assign one or more specialists for the regular job which are recurring in nature and, in such cases, the job notification is first sent to such specialist(s) only.

The selected first specialist 122 reaches the place where the cleaning and disinfecting service is to be rendered and completes the job. During this time the computer system 102 marks that specialist unavailable for any other job. The payment module 1324 of computer system 102 determines the payment parameters, automatically, as in step 406 based on one or more factors which include the service parameters acquired by the computer system 102 in step 404 of FIG. 4. The one or more factors also include factors such as the location of the cleaning site, accessibility of the site and availability of utilities such as power and water etc.

The scope of work, as estimated based on the service parameters initially received from a customer and, in some cases, also received from the specialist attending the cleaning and disinfecting service, may get changed during the course of completing the job. The specialist can enter one or more details with regard to the service parameters before start, during or on completion of the job through the user interface. Therefore, the payment module 1324 of the computer system 102 is configured to generate the final payment parameters, as in step 408 of FIG. 4, based on updated information on the above-mentioned one or more factors. For example, the actual area cleaned can be more or less than the initially estimated area, buffing and shampooing of surfaces may also have been done in addition to the initially requested service. The time spent by the specialist (the selected first specialist 122 in the present example) in completing the cleaning and disinfecting service may also accordingly vary from the initial estimate. In the present example, the selected first specialist 122 can manually update the service parameters using update service parameters option 1112 and then indicate completion of a job by using mark job complete option 1114 on the user interface 1110 of FIG. 11C. The customer/specialist tracking module 1322 of computer system 102 therefore calculates the time spent by the specialist on a cleaning job by tracking the location of the client device associated with the specialist as in step 310 of FIG. 3. The updated information on service parameters may be acquired from a customer client device also. The computer system 102 thus processes all the updated service parameters to determine if any additional payment parameters are required to be considered while generating the final invoice on completion of a job. Factors which may influence the additional payment parameters include market conditions and desirability parameters etc.

In some embodiments, for every registered user the present invention requires that user accounts also have that information (bank account details, for example) of user which is necessary for making financial transactions. This information can be asked by the computer system 102 during registration of a user. A user may also be asked to set up default modes for making and receiving payments.

For each service category, type and schedule, pre-defined fixed and/or hourly rates may be stored in data store 108. In some embodiments, such rates can be made dynamic by linking those with other factors such as market conditions and weather conditions etc. So, whenever payment parameters are required to be generated, the computer system 102 determines the amount of actual work done corresponding to the selected service parameters updated till that point of time and then auto-calculates cost, as in step 410 of FIG. 4, based on the already saved rates. Such calculations can be triggered manually by clicking on generate invoice option 1116 of user interface 1110 shown in FIG. 11C or can be triggered automatically as per a pre-defined time setting (weekly, monthly, for example).

Against the payment parameters, a customer can make a payment through conventional online transactions methods (internet banking, credit card payment, digital wallets etc., for example) or transactions can be completed automatically by the payment module 1324 by transferring funds from a customer's account to an account of a specialist or a franchisee as per pre-agreed terms as in step 312 of FIG. 3.

The customer feedback module 1326 and specialist feedback module 1328 of the computer system 102 allows customers and specialists respectively to input feedback against every cleaning and disinfecting service as in steps 314 and 316 of FIG. 3 on fulfillment of the payment parameters. Screen 1212 of FIG. 12C illustrates a feedback giving option through the user interface. Feedback may comprise comments/remarks and ratings.

While the present invention is susceptible to various modifications and alternative user interfaces, a certain illustrated embodiment thereof is shown in the drawings and has been described above in detail. It should be understood, however, that there is no intention to limit the invention to the specific form or forms disclosed, but on the contrary, the intention is to cover all modifications, alternative user interfaces, similar features and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

The flowcharts are used to describe the steps of the present invention. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described above may be omitted, repeated, and/or performed in a different order. In addition, additional steps, omitted in the flowcharts may be included in performing this method. Accordingly, the specific arrangement of steps shown in FIG. 3 and FIG. 4 should not be construed as limiting the scope of the invention.

What is claimed is:

1. A computer-implemented method for providing a cleaning and disinfecting service, said method being implemented on a computer system having one or more processors programmed with computer program instructions to perform said method, said method comprising:

providing, by said computer system, a user interface on a client device associated with a customer and with each of a plurality of specialists, said user interface being configured to receive a user input indicative of a request for said cleaning and disinfecting service and a selection of one or more service parameters from among a plurality of service parameters associated with said cleaning and disinfecting service;

defining, by said computer system, a virtual perimeter around a location of said client device associated with said customer based on a GPS-identified geographical location information received from a location module of said client device;

determining, by said computer system, a proximity of said client device associated with said plurality of specialists found within said virtual perimeter to said location of said client device associated with said customer;

configuring, a specialist tracking module of said computer system, to determine an estimated travel time to reach said location of said client device associated with said customer on a real-time basis based on said GPS-identified geographical location information received from said location module of said client device associated with said plurality of specialists;

configuring said computer system to allow a selection of a preferred specialist selection criterion from among a plurality of specialist selection criteria or a selection of a specialist auto-selection option, said plurality of specialist selection criteria comprising an experience of said plurality of specialists, a historical performance of said plurality of specialists, said estimated travel time and said proximity of said plurality of specialists;

configuring, a specialist selection module of said computer system, to enable a selection of one or more specialists from among said plurality of specialists based on said preferred specialist selection criterion if said selection of said preferred specialist selection criterion is opted by said customer or based on a selection score if said specialist auto-selection option is opted by said customer, said selection score being calculated by said computer system based on said plurality of specialist selection criteria each of which has a pre-assigned weightage;

configuring, an artificial intelligence module of said computer system, to analyze a visual imagery acquired from said client device associated with said selected one or more specialists to carry out feature extraction based on one or more factors including size, shape and color of one or more objects found in said visual imagery to determine an amount of actual service rendered and completion of said amount of actual service;

determining, by said computer system, one or more payment parameters based on one or more factors, said one or more factors comprising said amount of actual service; and enabling, by said computer system, receiving of a feedback given through said user interface by said customer and by said selected one or more specialists on a fulfillment of said one or more payment parameters.

2. The method of claim 1, wherein said plurality of service parameters include service category, service type and service schedule.

3. The method of claim 1, further comprising:
sending, by said computer system, a service proposal to said client device associated with said customer upon said selection of said one or more specialists; and
displaying, by said computer system, on said user interface on said client device associated with said customer an information on real-time tracking of said selected one or more specialists upon acceptance of said service proposal by said customer.

4. The method of claim 1, wherein said one or more factors further comprising one or more market related parameters.

5. The method of claim 1, wherein said fulfillment of said one or more payment parameters includes transfer of funds out of an account of said customer to an account related to said selected one or more specialists as per a predefined payment method.

6. The method of claim 1, wherein a list of said plurality of specialists is prepared by said computer system in descending order of said selection score.

7. The method of claim 6, wherein said selection of said one or more specialists by said computer system starts from top of said list.

8. A system for providing a cleaning and disinfecting service, said system comprising:
a computer system comprising one or more physical processors programmed with computer program instructions that, when executed by said one or more physical processors, program said computer system to:
provide a user interface on a client device associated with a customer and with each of a plurality of specialists, said user interface being configured to receive a user input indicative of a request for said cleaning and disinfecting service and a selection of one or more service parameters from among a plurality of service parameters associated with said cleaning and disinfecting service;
define a virtual perimeter around a location of said client device associated with said customer based on a GPS-identified geographical location information received from a location module of said client device;
determine a proximity of said client device associated with said plurality of specialists found within said virtual perimeter to said location of said client device associated with said customer;
determine an estimated travel time to reach said location of said client device associated with said customer on a real-time basis based on said GPS-identified geographical location information received from said client device associated with said plurality of specialists;
enable placing of a bid through said user interface by said plurality of specialists against said request for said cleaning and disinfecting service;
allow a selection of a preferred specialist selection criterion from among a plurality of specialist selection criteria or a selection of a specialist auto-selection option, said plurality of specialist selection criteria comprising an experience of said plurality of specialists, a historical performance of said plurality of specialists, said estimated travel time and said proximity of said plurality of specialists and a value of said bid;
select one or more specialists from among said plurality of specialists based on said preferred specialist selection criterion if said selection of said preferred specialist selection criterion is opted by said customer or based on a selection score if said specialist auto-selection option is opted by said customer, said selection score being calculated by said computer system based on said plurality of specialist selection criteria each of which having a pre-assigned weightage;
configure, an artificial intelligence module of said computer system, to analyze a visual imagery acquired from said client device associated with said selected one or more specialists to carry out feature extraction based on one or more factors including size, shape and color of one or more objects found in said visual imagery to determine an amount of actual service rendered and completion of said amount of actual service;
determine one or more payment parameters based on one or more factors, said one or more factors comprising said amount of actual service; and
enable receiving of a feedback given through said user interface by said customer and by said selected one or more specialists on a fulfillment of said one or more payment parameters.

9. The system of claim 8, wherein said one or more physical processors programmed with computer program instructions that, when executed by said one or more physical processors, further program said computer system to:
send a service proposal to said client device associated with said customer upon said selection of said one or more specialists; and
display on said user interface on said client device associated with said customer an information on real-time tracking of said selected one or more specialists upon acceptance of said service proposal by said customer.

10. The system of claim 8, wherein said fulfillment of said one or more payment parameters includes transfer of funds out of an account of said customer to an account related to said selected one or more specialists as per a predefined payment method.

11. The system of claim 8, wherein a list of said plurality of specialists is prepared by said computer system in descending order of said selection score.

12. The system of claim 11, wherein said selection of said one or more specialists by said computer system starts from top of said list.

\* \* \* \* \*